(12) United States Patent
Cheng et al.

(10) Patent No.: US 11,731,578 B2
(45) Date of Patent: Aug. 22, 2023

(54) COCOON AIRBAG TO PROTECT A SLEEPING OCCUPANT

(71) Applicant: GM Global Technology Operations LLC, Detroit, MI (US)

(72) Inventors: Yi-pen Cheng, Troy, MI (US); Chin-hsu Lin, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 35 days.

(21) Appl. No.: 17/510,834

(22) Filed: Oct. 26, 2021

(65) Prior Publication Data
US 2023/0125990 A1   Apr. 27, 2023

(51) Int. Cl.
*B60R 21/231* (2011.01)
*B60R 21/0134* (2006.01)

(52) U.S. Cl.
CPC ............... *B60R 21/23138* (2013.01); *B60R 21/0134* (2013.01)

(58) Field of Classification Search
CPC ........... B60R 21/23138; B60R 21/0134; B60R 21/2338; B60R 2021/23107
See application file for complete search history.

(56) References Cited

U.S. PATENT DOCUMENTS

| | | | |
|---|---|---|---|
| 11,225,216 B1* | 1/2022 | Lin et al. | B60R 21/23138 |
| 11,364,869 B1* | 6/2022 | Lin et al. | B60R 21/207 |
| 2004/0113409 A1* | 6/2004 | Ingemarsson et al. | B60R 21/01532 280/806 |
| 2019/0202395 A1* | 7/2019 | Obayashi et al. | B60R 21/231 |
| 2019/0299916 A1* | 10/2019 | Kanegae | B60R 21/01512 |
| 2020/0172040 A1* | 6/2020 | Cheng et al. | B60R 21/207 |
| 2021/0170983 A1* | 6/2021 | Shin et al. | B60R 21/207 |
| 2022/0111818 A1* | 4/2022 | Schneider et al. | B60R 21/207 |

FOREIGN PATENT DOCUMENTS

| | | | | |
|---|---|---|---|---|
| CN | 101596894 A | * | 12/2009 | B60R 21/214 |
| CN | 112810563 A | * | 5/2021 | B60R 21/207 |
| JP | 2018034772 A | * | 3/2018 | B60R 21/214 |
| JP | 2019119293 A | * | 7/2019 | B60R 21/23 |
| JP | 2019147426 A | * | 9/2019 | |
| KR | 20160140368 A | * | 12/2016 | |

* cited by examiner

*Primary Examiner* — Karen Beck
(74) *Attorney, Agent, or Firm* — Vivacqua Crane PLLC (57) ABSTRACT

An automobile vehicle deployable cocoon airbag system includes an airbag cushion having a first side oriented in a vertical configuration in a non-deployed condition and a second side oriented substantially ninety degrees from the first side in the non-deployed condition and adapted to receive an occupant on the second side providing an occupant sleeping position. At least one retracting tether is connected to the first side and the second side and is retracted using a retraction mechanism. The retraction mechanism acts upon receipt of a signal to retract the at least one retracting tether and pull the second side toward the first side thereby enclosing the occupant between the first side and the second side in a deployed condition of the airbag cushion. At least one energy absorbing (EA) element is connected to the airbag cushion acting to restrict a fore-aft motion of the airbag cushion.

19 Claims, 7 Drawing Sheets

COCOON AIRBAG TO PROTECT A SLEEPING OCCUPANT

INTRODUCTION

The present disclosure relates to automobile vehicle occupant protection airbag systems.

In known automobile vehicle occupant protection systems, a sleeping occupant may not be restrained and protected in a vehicle crash coming from all directions. Known occupant protection systems require a seat belt as a primary restraint system for a sleeping occupant occupying a vehicle seat. Present automobile vehicle airbag systems are not sensitive to how people sleep, i.e., lie-flat versus sleeping on the side.

Thus, while current vehicle occupant protection systems achieve their intended purpose, there is a need for a new and improved system and method to protect sleeping vehicle occupants during vehicle collisions.

SUMMARY

According to several aspects, an automobile vehicle deployable cocoon airbag system includes an airbag cushion. The airbag cushion includes a first side oriented in a vertical configuration in a non-deployed condition. A second side of the airbag cushion is oriented substantially ninety degrees from the first side in the non-deployed condition and is adapted to receive an occupant on the second side providing an occupant sleeping position. At least one retracting tether is connected to the first side and the second side and is retracted using a retraction mechanism. The retraction mechanism acts upon receipt of a signal to retract the at least one retracting tether and pull the second side toward the first side thereby enclosing the occupant between the first side and the second side in a deployed condition of the airbag cushion. At least one energy absorbing (EA) element is connected to the airbag cushion acting to restrict a fore-aft motion of the airbag cushion.

In another aspect of the present disclosure, the at least one retracting tether includes: at least a first retracting tether connected at a first end of the first side and at a first end of the second side; and at least a second retracting tether connected at a second end of the first side and at a second end of the second side.

In another aspect of the present disclosure, the first retracting tether defines a first retracting tether pair and the second retracting tether defines a second retracting tether pair the first retracting tether pair and the second retracting tether pair having connection points of the first retracting tether pair with a first end of the second side and having connection points of the second retracting tether pair with a second end of the second side.

In another aspect of the present disclosure, the at least one EA element defines a first EA element and a second EA element.

In another aspect of the present disclosure, the connection points of first retracting tether pair are separated by a first spacing and the connection points of the second retracting tether pair are separated by a second spacing such that the first retracting tether pair form a triangle-shape having an apex located at the first EA element and the second retracting tether pair form a triangle-shape having an apex located at the second EA element.

In another aspect of the present disclosure, a head area of the airbag cushion extends from the first end of the first side and the first end of the second side; and a unitary tether is connected to the head area. The unitary tether is retracted upon receipt of the signal to shape a volume of the head area around a head of the occupant during deployment of the head area to prevent a shoulder area of the occupant from sliding through an open end of the airbag cushion in a fore-aft direction when the airbag cushion is in the deployed condition.

In another aspect of the present disclosure, a sensor communicates with the at least one energy absorbing element, the sensor generating the signal.

In another aspect of the present disclosure, the sensor defines a pre-crash sensor defining an accelerometer wherein the signal is generated by the sensor signifying when a vehicle crash is imminent requiring deployment of the airbag cushion.

In another aspect of the present disclosure, multiple airbag sections of the airbag cushion upon receipt of the signal are inflated to provide substantially 360-degree circumferential coverage of the occupant.

In another aspect of the present disclosure, a substantially rigid connecting arm fixed at a free end to a corner of the second side. A rotating connection rotatably connects the connecting arm to a vehicle compartment wall. A guide arm positioned proximate to the connecting arm provides a tracking path for a travel motion of the connecting arm.

According to several aspects, a deployable cocoon airbag system includes an airbag cushion having: a first side oriented in a vertical configuration in a non-deployed condition and movably attached to a wall of an automobile vehicle; and a second side oriented substantially ninety degrees from the first side in the non-deployed condition adapted to receive an occupant on the second side providing an occupant sleeping position. At least one retracting tether is connected to the first side and the second side and is retracted using a retraction mechanism. The retraction mechanism acts upon receipt of a sensor signal to retract the at least one retracting tether and pull the second side toward the first side thereby enclosing the occupant between the first side and the second side in a deployed condition of the airbag cushion. Multiple airbag sections of the airbag cushion upon receipt of the sensor signal are inflated to provide substantially 360-degree circumferential coverage of the occupant in the deployed condition during a side impact to the automobile vehicle. At least one energy absorbing (EA) element connected to the first side of the airbag cushion restricts a fore-aft motion of the airbag cushion.

In another aspect of the present disclosure, a second airbag cushion is similarly configured to the first airbag cushion, the second airbag cushion positioned oppositely about a center dividing wall within the automobile vehicle with respect to the first airbag cushion.

In another aspect of the present disclosure, the first side of the first airbag cushion is connected to a first wall face of the center dividing wall and a third side of the second airbag cushion is connected to a second wall face of the center dividing wall.

In another aspect of the present disclosure, the first airbag cushion is positioned in a first occupant sleeping compartment of the automobile vehicle and the second airbag cushion is positioned in a second occupant sleeping compartment of the automobile vehicle.

In another aspect of the present disclosure, the first airbag cushion and the second airbag cushion are aligned in a fore-aft configuration allowing limited motion of the first airbag assembly and the second airbag assembly in the fore-aft motion limited by the at least one EA element.

In another aspect of the present disclosure, a head area of the first airbag cushion extends from the first end of the first side and the first end of the second side.

In another aspect of the present disclosure, the head area is inflated upon receipt of the sensor signal about a head of the occupant to prevent a shoulder area of the occupant from sliding through an open end of the first airbag cushion in a fore-aft direction.

According to several aspects, a method for protecting a sleeping occupant of an automobile vehicle using an airbag cushion includes: generating a signal from a pre-crash sensor which determines that a vehicle crash is imminent and requires deployment of the airbag cushion to protect the sleeping occupant; pulling ends of a second side of the airbag cushion toward an edge of a first side of the airbag cushion to roll/enclose the sleeping occupant at a predetermined time of "x" msec prior to a crash impact using a tether mechanism; and enclosing the occupant between the first side and the second side of the airbag cushion for occupant protection at an onset of the crash impact.

In another aspect of the present disclosure, the method further includes dissipating fore/aft impact energy acting on the occupant using energy absorbing elements positioned between the airbag cushion and a vehicle interior.

In another aspect of the present disclosure, the method further includes inflating the airbag cushion to firmly grip the occupant between the first side and the second side of the airbag cushion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
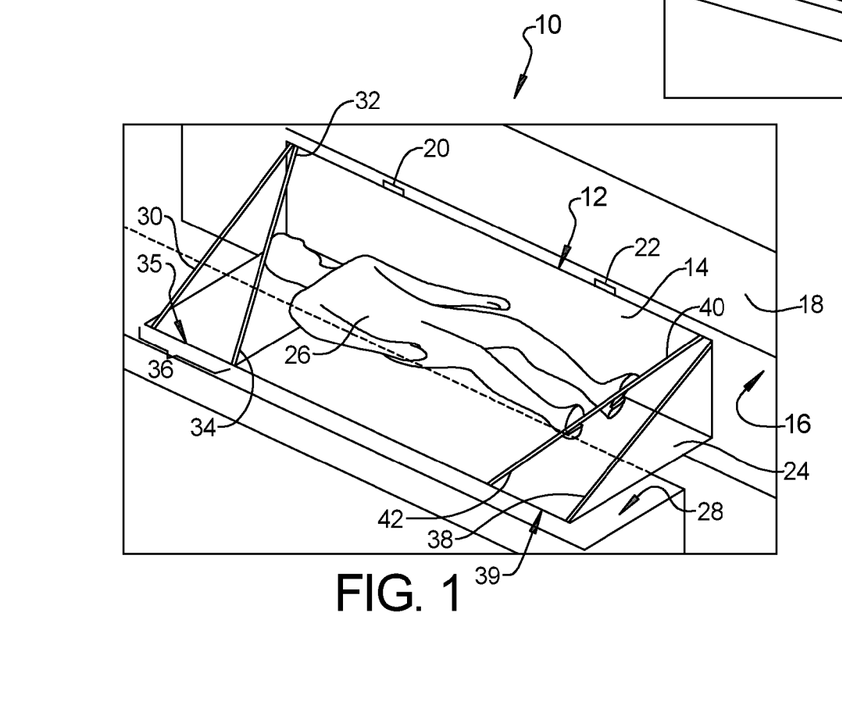
FIG. 1 is a left rear perspective view looking forward of a cocoon airbag system according to an exemplary aspect.

Referring to FIG. 1, a cocoon airbag system 10 includes an L-shaped first airbag cushion 12 shown in an occupant sleeping position having a first side 14 initially configured in a vertical orientation positioned in direct contact with a vehicle compartment wall 16 of an automobile vehicle 18. The first side 14 is provided with at least one attachment member to connect the first side 14 to the vehicle compartment wall 16 including a first attachment member 20 and a second attachment member 22. The first airbag cushion 12 further includes a second side 24 initially positioned in a flat configuration providing a support surface for a first occupant 26 who may be sleeping in a horizontal orientation. The second side 24 is supported by direct contact with a substantially flat floor member 28 of the automobile vehicle 18.

A first end of the second side 24 of the first airbag cushion 12 includes a first retracting tether 30 and a first energy absorbing (EA) element 32 connected to the first side 14 and a second retracting tether 34 connected proximate to the first EA element 32. The first retracting tether 30 and the second retracting tether 34 together define a first tether pair, with tether individual connection points coupled with a first end 35 of the second side 24 of the first airbag cushion 12. The connection points may be separated by a spacing 36 such that the first retracting tether 30 and the second retracting tether 34 form a triangle-shape having an apex of the triangle-shape located proximate to the first EA element 32.

A second end of the second side 24 of the first airbag cushion 12 is connected by a third retracting tether 38 to the first side 14 and includes a second energy absorbing (EA) element 40. A fourth retracting tether 42 is also connected to the first side 14 proximate to the second EA element 40. The third retracting tether 38 and the fourth retracting tether 42 together define a second tether pair, with connection points of the third retracting tether 38 and the fourth retracting tether 42 with the second side 24 of the first airbag cushion 12 separated by a spacing similar to the spacing 36 such that the third retracting tether 38 and the fourth retracting tether 42 form a triangle-shape having an apex located proximate to the second EA element 40.

Referring to FIG. 2 and again to FIG. 1, the first airbag cushion 12 may be positioned in a first occupant sleeping compartment 44 of the automobile vehicle 18, which may for example be positioned rearward of a driving compartment 46 provided for operational control of the automobile vehicle 18. According to several aspects the automobile vehicle 18 may define an autonomously operated vehicle, a sport utility vehicle (SUV), a van, a truck, or the like. A second airbag cushion 12′, shown and described in greater detail in reference to FIG. 3, may be positioned substantially parallel to the first airbag cushion 12 in a second occupant sleeping compartment 48 of the automobile vehicle 18.

Figure 2:
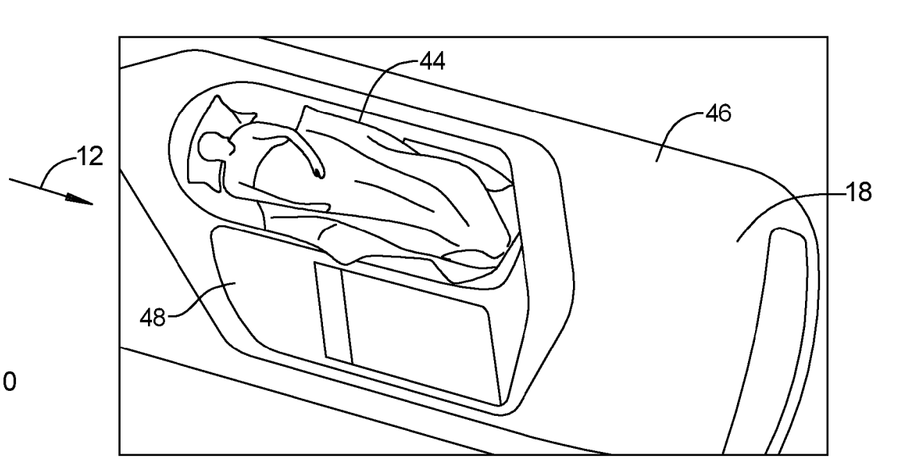
FIG. 2 is a topo plan view of an automobile vehicle having occupant sleeping compartments incorporating a cocoon airbag system of FIG. 1.

Referring to FIG. 3 and again to FIGS. 1 and 2, a cocoon airbag system 50 is modified from the cocoon airbag system 10 to provide the first airbag cushion 12 and the second airbag cushion 12' in parallel configuration. A center dividing wall 52 or console separates the first occupant sleeping compartment 44 from second occupant sleeping compartment 48 and therefore separates the first occupant 26 from a second occupant 54 who may also be sleeping in a horizontal orientation. In lieu of connecting the first side 14 of the first airbag cushion 12 to the vehicle compartment wall 16 of the automobile vehicle 18, the first side 14 of the first airbag cushion 12 may be connected to a first dividing wall face 58 of the center dividing wall 52.

Figure 3:
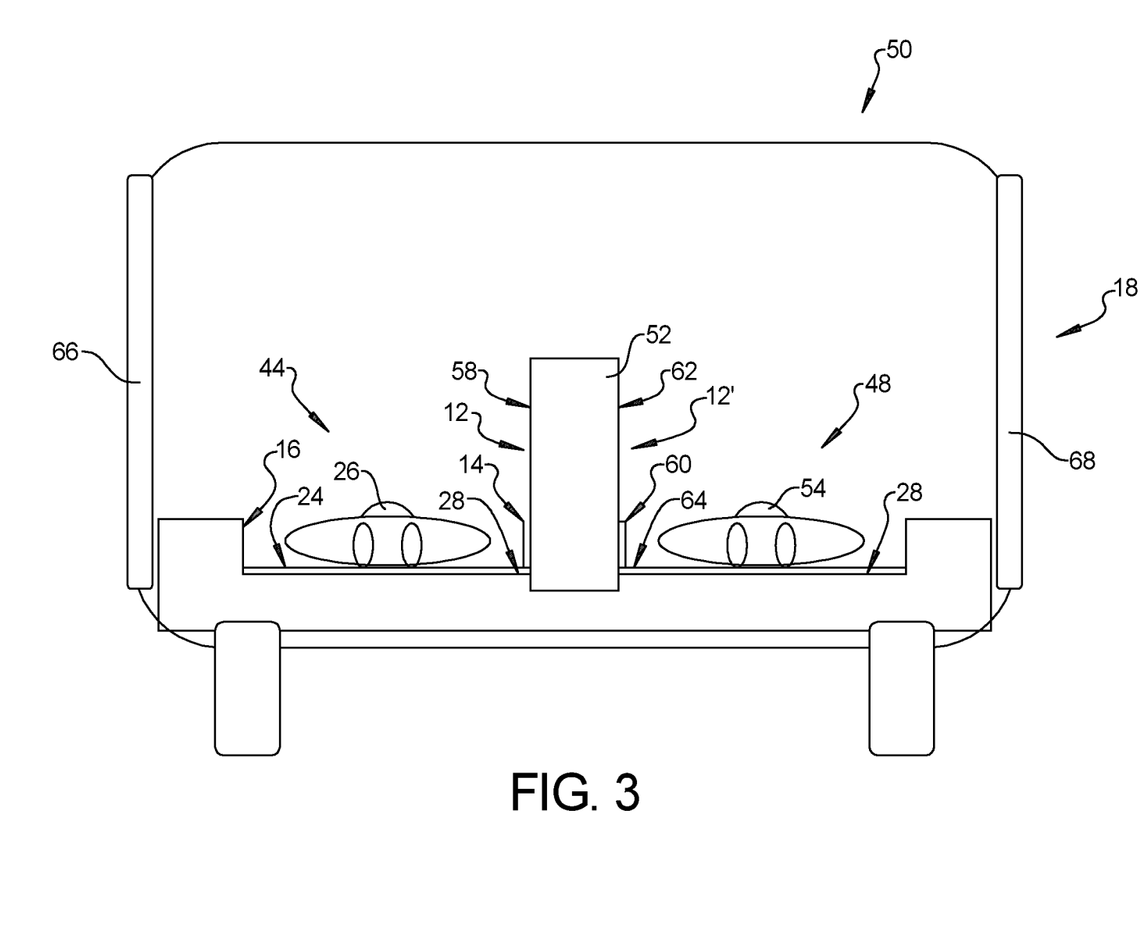
FIG. 3 is an end elevational view looking forward of a first and a second airbag cushion of FIG. 1.

The second airbag cushion 12' is similarly configured as the first airbag cushion 12 and includes a third side 60 initially configured in a vertical orientation and positioned in direct contact with a second dividing wall face 62 of the center dividing wall 52 oppositely facing with respect to the first dividing wall face 58. The third side 60 is provided with at least one attachment member to connect the third side 60 to the second dividing wall face 62 similar to the configuration and function of the first attachment member 20 and the second attachment member 22 described in reference to FIG. 1. The second airbag cushion 12' further includes a fourth side 64 initially positioned in a flat configuration providing a support surface for the second sleeping occupant 54. The fourth side 64 is supported by direct contact with the substantially flat floor member 28 of the automobile vehicle 18.

According to further aspects a first door 66 provides access to the first occupant sleeping compartment 44 and a second door 68 provides access to the second occupant sleeping compartment 48. According to further aspects, the cocoon airbag system 50 operates with the second side 24 rolling upward and toward the first dividing wall face 58 to enclose the first occupant 26 and the fourth side 64 rolls in an opposite direction compared to the second side 24 such that the fourth side 64 rolls upward and toward the second dividing wall face 62.

Referring to FIG. 4 and again to FIGS. 1 through 3, the second airbag cushion 12' described in reference to FIG. 3 is similarly configured and operated as the first airbag cushion 12, therefore the following discussion of the operation of the first airbag cushion 12 applies equally to the second airbag cushion 12'. A top edge 70 of the first side 14 is constrained to move along a fore-aft direction 72 and thereby the first side 14 and the second side 24 may commonly move together in the fore-aft direction 72. The first EA element 32 and the second EA element 40 define first and second tether mechanisms 74, 74' individually having a retractor to retract the paired tethers such as the first retracting tether 30 and the second retracting tether 34 and to retract the third retracting tether 38 and the fourth retracting tether 42 to pull a fabric of the first airbag cushion 12 upward enclose the first occupant 26.

The first EA element 32 and the second EA element 40 including the first tether mechanism 74 and the second tether mechanism 74' communicate with at least one sensor 76. The sensor 76 defines a pre-crash sensor such as an accelerometer producing a signal signifying when a vehicle crash is imminent which requires deployment of the first airbag cushion 12. The signal from the sensor 76 is forwarded to the first and second tether mechanisms 74, 74' which initiate retraction of the tethers. An additional fifth tether 78 may also be provided which extends approximately from the first attachment member 20 to a connection position of the first retracting tether 30 with the second side 24. According to several aspects, the fifth tether 78 may be provided with its own EA element and may individually include a retractor and is also in communication with the sensor 76. The fifth tether 78 shapes a smaller volume around a head 80 of the first occupant 26 after deployment of the first airbag cushion 12 to prevent a shoulder area or a foot area of the first occupant 26 from sliding through an open end of the first airbag cushion 12 in one of the fore-aft directions 72 when the first airbag cushion is in a deployed condition shown and described in reference to FIGS. 6, 7, 10 and 13 below.

Figure 4:
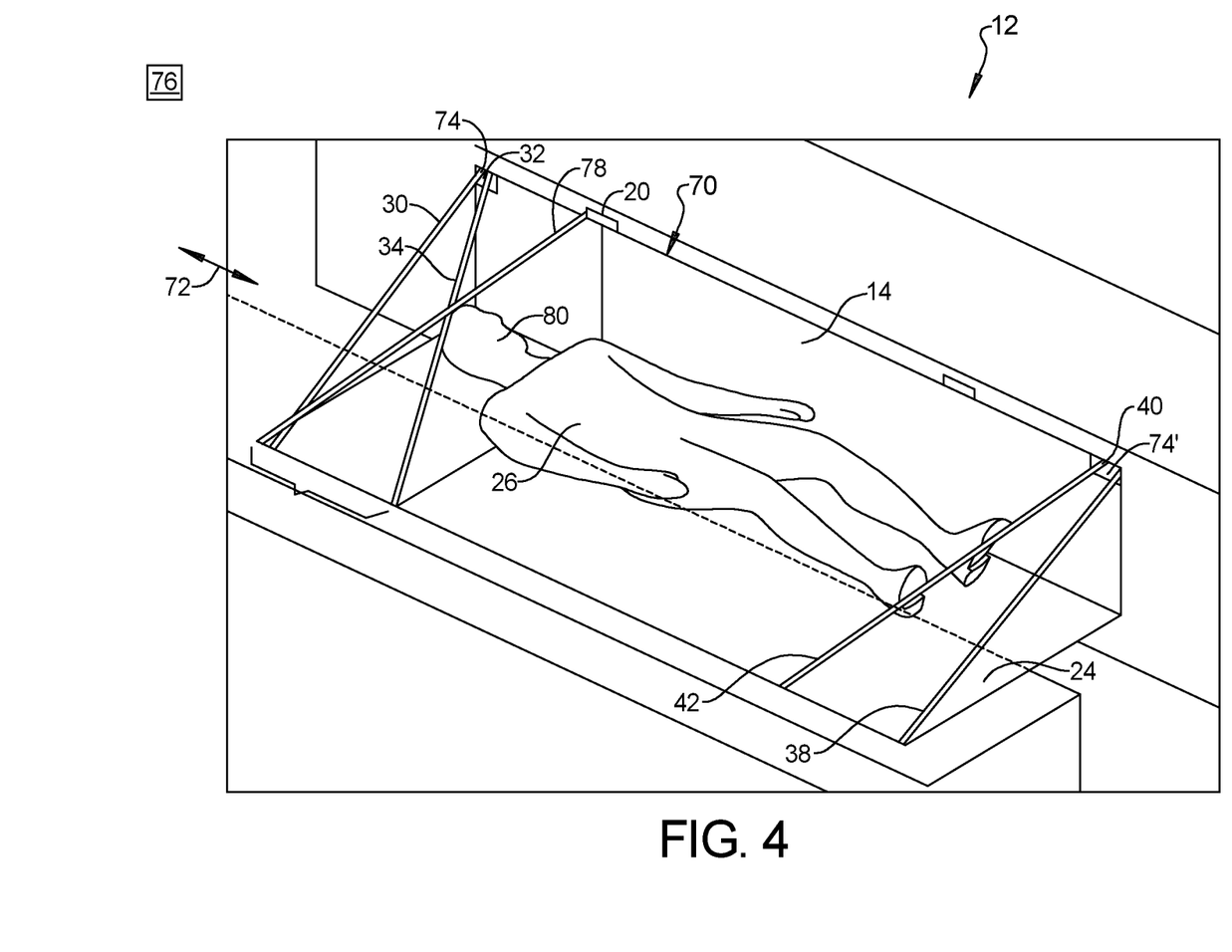
FIG. 4 is a left rear perspective view similar to FIG. 1.

Referring to FIG. 5 and again to FIG. 4, the first airbag cushion 12 may include a head protection portion 82 which is located proximate to the head 80 of the first occupant 26. As the fifth tether 78 described in reference to FIG. 4 is retracted, the head protection portion 82 contracts about the head 80 in a deployed position shown in reference to FIGS. 6 and 7 below.

Figure 5:
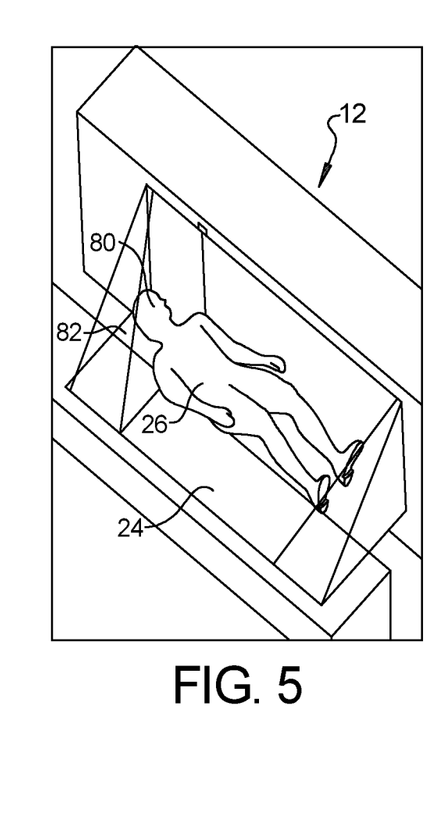
FIG. 5 is a left rear perspective view similar to FIG. 1 showing a non-deployed condition of the airbag cushion.

Referring to FIG. 6 and again to FIG. 5, the first airbag cushion 12 is shown in a contracted or fully deployed position, which totally encloses the first occupant 26 such that the first occupant 26 is not visible in this view. The first airbag cushion 12 together with the first occupant 26 are displaced toward the vehicle compartment wall 16 such that the first side 14', presented with an apostrophe to depict its inflated condition, is positioned between the first occupant 26 and the vehicle compartment wall 16. The second side 24', also presented with an apostrophe to depict its inflated condition, holds the first occupant 26 against the first side 14'.

Figure 6:
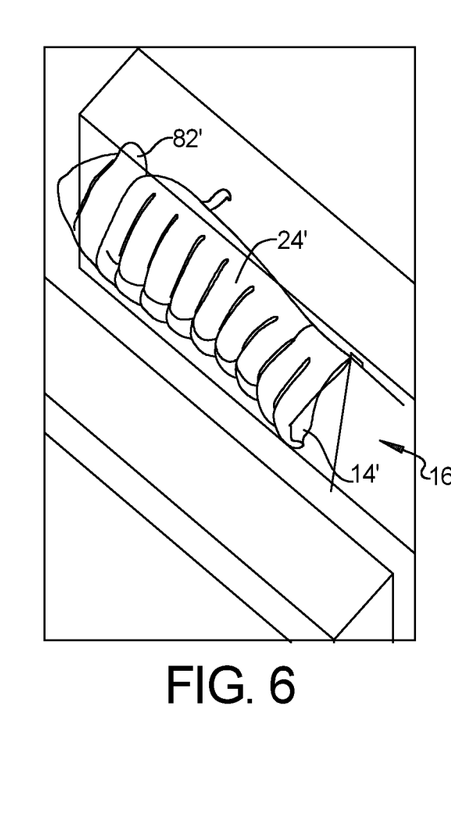
FIG. 6 is a left rear perspective view similar to FIG. 1 showing a fully deployed condition of the airbag cushion.
Figure 7:
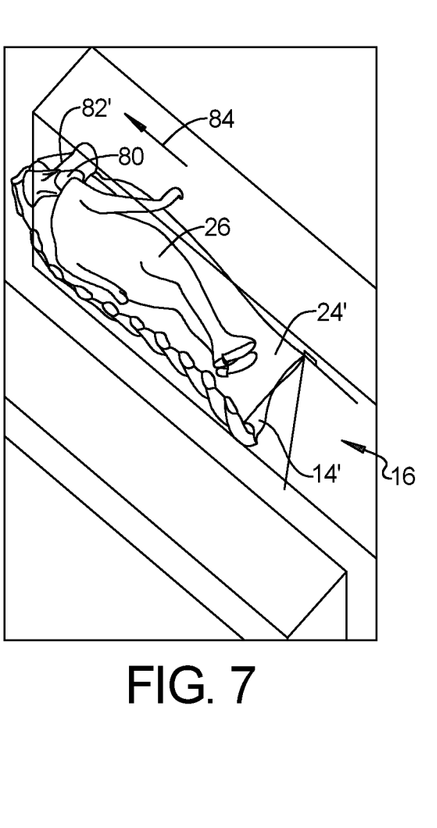
FIG. 7 is a partial cross-sectional transparent view of the configuration of FIG. 6 showing an encapsulated occupant.

Referring to FIG. 7 and again to FIGS. 5 and 6, with the head protection portion 82' inflated the head protection portion 82' wraps about the head 80 of the first occupant 26. The first occupant 26 is frictionally retained between the inflated first side 14' and the inflated second side 24' and is restricted from fore-aft motion, for example in a forward displacement direction 84 by the inflated head protection portion 82' which increases frictional contact with the first occupant 26, adding to the frictional contact to the first occupant 26 due to the inflated first side 14' and the inflated second side 24'.

Referring to FIG. 8 and again to FIGS. 5 and 6, the tethers such as the first retracting tether 30 may be assisted using a substantially rigid first connecting arm 86 which is fixed at a free end 88 to a far corner of the second side 24. A rotating connection 90 rotatably connects the first connecting arm 86 to the vehicle compartment wall 16. A substantially rigid second connecting arm 92 which is similar to the first connecting arm 86 may be connected at an opposite edge of the second side 24.

Figure 8:
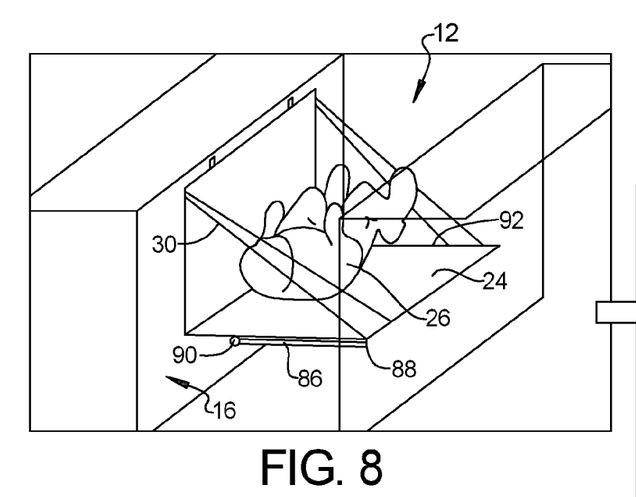
FIG. 8 is a front left perspective view looking rearward modified from FIG. 1 to show first and second connecting arms in a non-deployed condition of the airbag cushion.

Referring to FIG. 9 and again to FIG. 8, upon receipt of the signal from the sensor 76 the tethers begin to retract to collapse the second side 24 about the first occupant 26 and the first EA element 32 and the second EA element 40 thereafter control and restrict a fore-aft motion of the first occupant 26. The first connecting arm 86 and the second connecting arm 92 rotate and help retain a shape of the second side 24 as the second side 24 rotates and begins to enclose the first occupant 26.

Figure 9:
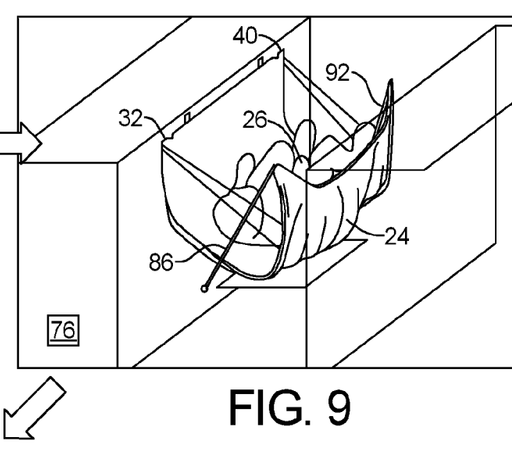
FIG. 9 is a front left perspective view looking rearward modified from FIG. 8 to show a partially deployed condition of the airbag cushion.
Figure 10:
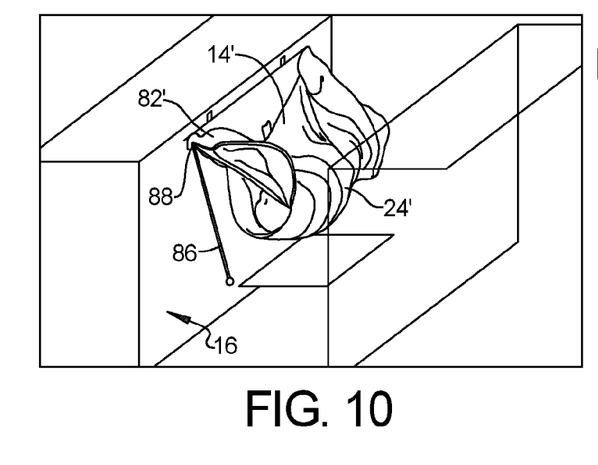
FIG. 10 is a front left perspective view looking rearward modified from FIG. 9 to show a fully deployed condition of the airbag cushion.

Referring to FIG. 10 and again to FIGS. 8 and 9, at a deployed condition or position of the first airbag cushion 12 the inflated and retracted second side 24' encloses the first occupant 26. The free end 88 of the first connecting arm 86 contacts the vehicle compartment wall 16 to stop rotation of the now inflated second side 24. The second connecting arm 92 described in reference to FIGS. 8 and 9 is also fully rotated similar to the first connecting arm 86 and is not visible in this view.

Referring to FIG. 11 and again to FIGS. 1, 3, and 8 through 10, a cocoon airbag system 94 is modified from the cocoon airbag system 10 and the cocoon airbag system 50 to provide a guide arm 96 positioned proximate to the first connecting arm 86. According to several aspects, the guide arm 96 provides a tracking path for the first connecting arm 86. The guide arm 96 may also stiffen the normal or L-shape of the first airbag cushion 12 and provide a location for the first occupant 26 to position the head 80.

Figure 11:
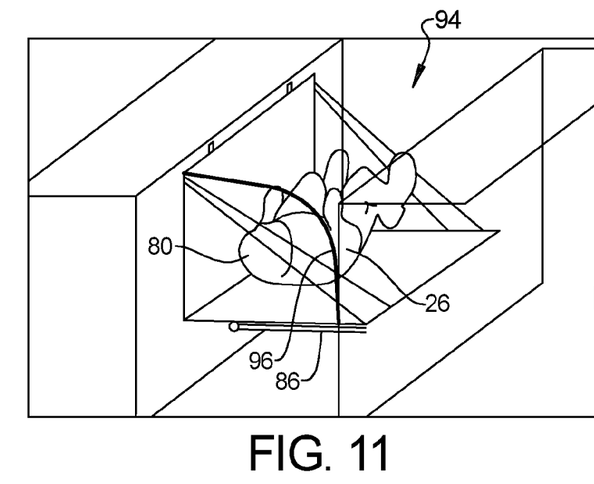
FIG. 11 is a front left perspective view looking rearward modified from FIG. 8 to show a guide arm in a non-deployed condition of the airbag cushion.

Referring to FIG. 12 and again to FIG. 11, upon receipt of the signal from the sensor 76 the tethers begin to retract using the first EA element 32 and the second EA element 40. The first connecting arm 86 and the second connecting arm 92 rotate and help retain a shape of the second side 24 as the second side 24 rotates and begins to enclose the first occupant 26. The guide arm 96 may guide a path of travel or rotating motion of the first connecting arm 86 as the first connecting arm 86 rotates.

Figure 12:
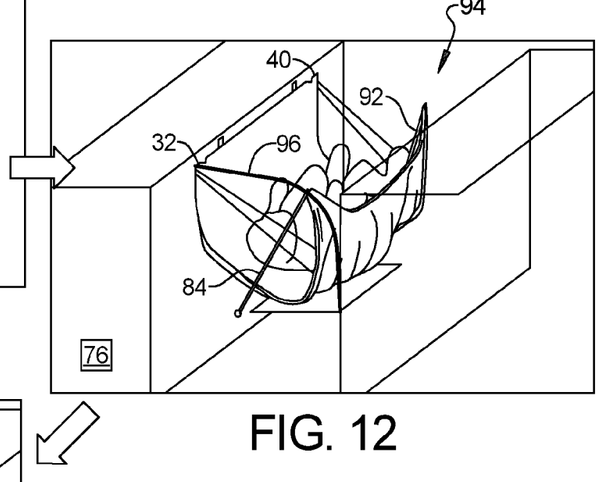
FIG. 12 is a front left perspective view looking rearward modified from FIG. 11 to show a partially deployed condition of the airbag cushion.
Figure 13:
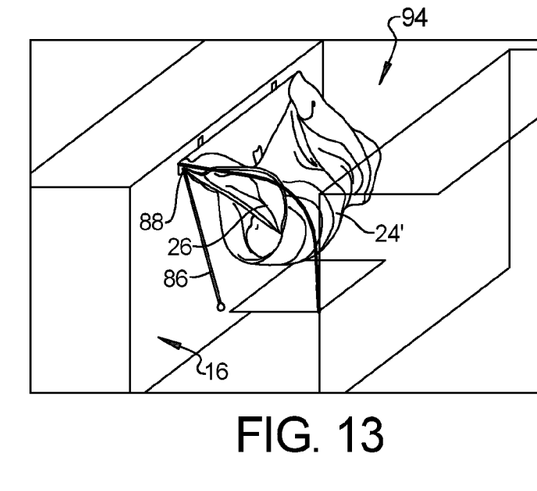
FIG. 13 is front left perspective view looking rearward modified from FIG. 12 to show a fully deployed condition of the airbag cushion.

Referring to FIG. 13 and again to FIGS. 11 and 12, at a deployed position of the cocoon airbag system 94 the inflated and retracted second side 24' encloses the first occupant 26. The free end 88 of the first connecting arm 86 contacts the vehicle compartment wall 16 to stop rotation of the now inflated second side 24'. The second connecting arm 92 is also fully rotated similar to the first connecting arm 86 and is not visible in this view. The guide arm 96 continues to frame the second side 24' and may also act to restrict displacement of the cocoon airbag system 94 airbag cushion.

Figure 14:
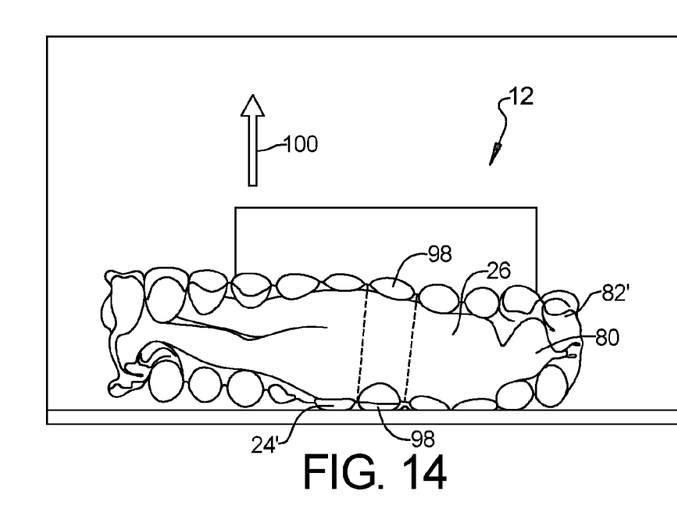
FIG. 14 is a side elevational partial cross sectional view of a fully deployed airbag cushion of the present disclosure during a vehicle side impact.

Referring to FIG. 14 and again to FIGS. 1 through 13, an airbag cushion of the present disclosure such as the first airbag cushion 12 surrounds and encapsulates the occupant such as the first occupant 26 in a fully deployed condition shown. In the fully deployed condition multiple airbag sections such as an exemplary airbag section 98 are fully inflated to provide substantially 360-degree circumferential coverage of the occupant when the occupant is accelerated in a side impact direction 100. The head protection portion 82' when present and fully inflated also protects the head 80.

Figure 15:
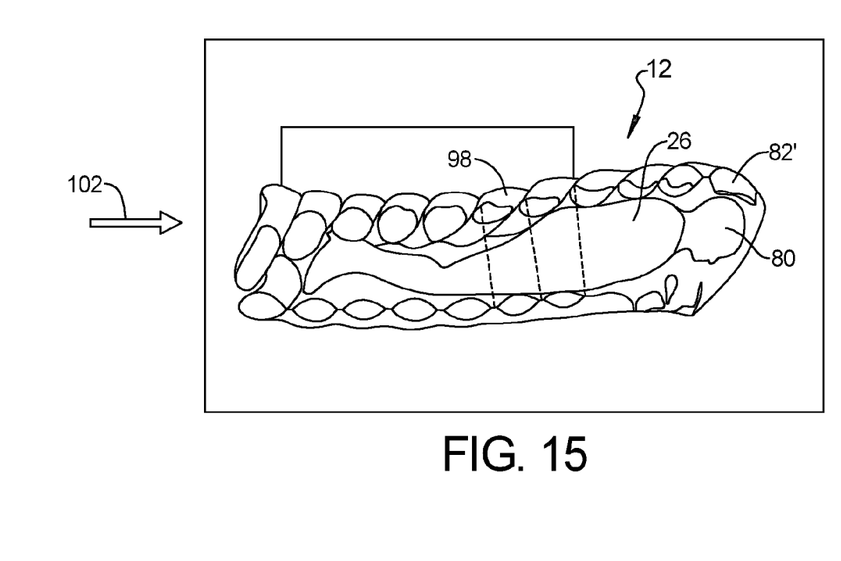
FIG. 15 is a side elevational partial cross sectional view of a fully deployed airbag cushion of the present disclosure during a vehicle front impact.

Referring to FIG. 15 and again to FIGS. 1 through 14, an airbag cushion of the present disclosure such as the first airbag cushion 12 surrounds and encapsulates the occupant such as the first occupant 26 in the fully deployed condition shown. In the fully deployed condition multiple airbag sections such as the exemplary airbag section 98 are fully inflated to provide substantially 360-degree circumferential coverage of the occupant and frictionally resist fore-aft displacement of the occupant when the occupant is accelerated in a fore-aft impact direction 102. The head protection portion 82' when present and fully inflated also restricts fore-aft motion of the shoulders toward a restricted opening created in the inflated head protection portion 82' for example near the head 80.

A cocoon airbag system of the present disclosure offers several advantages. These include an airbag cushion designed to protect a sleeping occupant in a vehicle crash coming from all or any direction. In the event of a vehicle crash, the cocoon airbag cushion of the present disclosure will roll-up and hold the occupant firmly inside the airbag cushion. The airbag cushion is also equipped with energy absorbing (EA) elements to reduce the forces acting on the occupant.

The deployable cocoon airbag systems of the present disclosure enclose, restrain and protect a sleeping occupant from impacts to the automobile vehicle coming from various or any direction. The tethers of the present disclosure act to enclose the occupant inside the cocoon airbag cushion by providing a desired airbag cushion shape to engage the occupant's shoulder or shoulders and head for protection. By inflating cushion sections of the airbag cushion and rolling the airbag cushion into a cocoon-like chamber the pressurized airbag cushion firmly and frictionally grips the occupant and to protect the occupant from contacting or striking violently into a vehicle interior or from exiting from the airbag cushion.

For impacts from a head-to-feet direction, the presently disclosed system when equipped with the EA designs described herein can reduce the occupant's deceleration and hence minimize potential occupant injury. For vehicle side impacts, the inflated cocoon airbag cushion of the present disclosure provides cushion protection for the occupant when impacted directly from vehicle interior components.

The cocoon airbag system of the present disclosure is self-sufficient in protecting a sleeping occupant and is insensitive to an occupant's sleep position, whether lying flat or if the occupant is sleeping on a side of the occupant. The airbag cushion system of the present disclosure also works independently of a traditional 3-point seat belt.

An airbag cushion deployment sequence with respect to vehicle impact timing may be as follows: 1) The sensor 76 determines that a severe crash is imminent and requires airbag deployment to protect a sleeping occupant. 2) At "x" msec prior to the impact wherein "x" msec defines a predetermined value of msec, the "tether mechanism" at ends of the cocoon airbag cushion upper edge pull the two ends of the second side toward the upper edge of the first side and roll/enclose the sleeping occupant. 3) At the onset of an impact, the cocoon airbag cushion begins to inflate to enclose the occupant for protection. 4) The airbag cushion when fully inflated firmly frictionally grips the occupant. 5) Built-in EA elements between the airbag cushion and the vehicle interior dissipate fore/aft impact energy acting on the occupant and minimize potential injury.

An L-shape airbag cushion, placed underneath a lie-flat occupant, deploys, rolls, and encloses the occupant from head-to-toe like a cocoon and protects the occupant from crash impact in all directions. The inflated cocoon airbag cushion will restrain and protect the occupant during a vehicle crash in all impact directions. Energy Absorbing (EA) elements placed between the cocoon airbag cushion and the vehicle compartment will activate to reduce the occupant's deceleration and minimize potential injury during front, rear, and side impacts.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle deployable cocoon airbag system, comprising:
an airbag cushion including:
a first side oriented in a vertical configuration in a non-deployed condition;
a second side oriented substantially ninety degrees from the first side in the non-deployed condition adapted to receive an occupant on the second side providing an occupant sleeping position;
at least one retracting tether connected to the first side and the second side and retracted using a retraction mechanism, the retraction mechanism acting upon receipt of a signal to retract the at least one retracting tether and pull the second side toward the first side thereby enclosing the occupant between the first side and the second side in a deployed condition of the airbag cushion, wherein the at least one retracting tether includes at least a first retracting tether connected at a first end of the first side and at a first end of the second side and at least a second retracting tether connected at a second end of the first side and at a second end of the second side; and at least one energy absorbing (EA) element connected to the airbag cushion acting to restrict a fore-aft motion of the airbag cushion.

2. The automobile vehicle deployable cocoon airbag system of claim 1, wherein the first retracting tether defines a first retracting tether pair and the second retracting tether defines a second retracting tether pair, the first retracting tether pair and the second retracting tether pair having connection points of the first retracting tether pair with the first end of the second side and having connection points of the second retracting tether pair with the second end of the second side.

3. The automobile vehicle deployable cocoon airbag system of claim 2, wherein the at least one EA element defines a first EA element and a second EA element.

4. The automobile vehicle deployable cocoon airbag system of claim 3, wherein the connection points of first retracting tether pair are separated by a first spacing and the connection points of the second retracting tether pair are separated by a second spacing such that the first retracting tether pair form a triangle-shape having an apex located at the first EA element and the second retracting tether pair form a triangle-shape having an apex located at the second EA element.

5. The automobile vehicle deployable cocoon airbag system of claim 1, further including:
a head area of the airbag cushion extending from the first end of the first side and the first end of the second side; and
a unitary tether connected to the head area, the unitary tether retracted upon receipt of the signal to shape a volume of the head area around a head of the occupant during deployment of the head area to prevent a shoulder area of the occupant from sliding through an open end of the airbag cushion in a fore-aft direction when the airbag cushion is in the deployed condition.

6. The automobile vehicle deployable cocoon airbag system of claim 1, further including a sensor communicating with the at least one energy absorbing element, the sensor generating the signal.

7. The automobile vehicle deployable cocoon airbag system of claim 6, wherein the sensor defines a pre-crash sensor defining an accelerometer wherein the signal is generated by the sensor signifying when a vehicle crash is imminent requiring deployment of the airbag cushion.

8. The automobile vehicle deployable cocoon airbag system of claim 1, further including multiple airbag sections of the airbag cushion which upon receipt of the signal are inflated to provide substantially 360-degree circumferential coverage of the occupant.

9. The automobile vehicle deployable cocoon airbag system of claim 1, including:
a substantially rigid connecting arm fixed at a free end to a corner of the second side;
a rotating connection rotatably connecting the connecting arm to a vehicle compartment wall; and
a guide arm positioned proximate to the connecting arm and providing a tracking path for a travel motion of the connecting arm.

10. A deployable cocoon airbag system, comprising:
a first airbag cushion including:
a first side oriented in a vertical configuration in a non-deployed condition and movably attached to a wall face of an automobile vehicle; and
a second side oriented substantially ninety degrees from the first side in the non-deployed condition adapted to receive an occupant on the second side providing an occupant sleeping position;
at least one retracting tether connected to the first side and the second side and retracted using a retraction mechanism, the retraction mechanism acting upon receipt of a sensor signal to retract the at least one retracting tether and pull the second side toward the first side thereby enclosing the occupant between the first side and the second side in a deployed condition of the airbag cushion;
multiple airbag sections of the airbag cushion which upon receipt of the sensor signal are inflated to provide substantially 360-degree circumferential coverage of the occupant in the deployed condition during a side impact to the automobile vehicle; and
at least one energy absorbing (EA) element connected to the first side of the airbag cushion restricting a fore-aft motion of the airbag cushion.

11. The deployable cocoon airbag system of claim 10, further including a second airbag cushion similarly configured to the first airbag cushion, the second airbag cushion positioned oppositely about a center dividing wall within the automobile vehicle with respect to the first airbag cushion.

12. The deployable cocoon airbag system of claim 11, wherein the first side of the first airbag cushion is connected to a first wall face of the center dividing wall and a third side of the second airbag cushion is connected to a second wall face of the center dividing wall.

13. The deployable cocoon airbag system of claim 11, wherein the first airbag cushion is positioned in a first occupant sleeping compartment of the automobile vehicle and the second airbag cushion is positioned in a second occupant sleeping compartment of the automobile vehicle.

14. The deployable cocoon airbag system of claim 11, wherein the first airbag cushion and the second airbag cushion are aligned in a fore-aft configuration allowing limited motion of the first airbag cushion and the second airbag cushion in the fore-aft motion limited by the at least one EA element.

15. The deployable cocoon airbag system of claim 10, further including a head area of the first airbag cushion extending from a first end of the first side and a first end of the second side.

16. The deployable cocoon airbag system of claim 15, wherein the head area is inflated upon receipt of the sensor signal about a head of the occupant to prevent a shoulder area of the occupant from sliding through an open end of the first airbag cushion in a fore-aft direction.

17. A method for protecting an occupant of an automobile vehicle using an airbag cushion, comprising:
generating a signal from a pre-crash sensor identifying that a vehicle crash is imminent and requires deployment of the airbag cushion to protect an occupant sleeping on the airbag cushion;
pulling an end of a second side of the airbag cushion toward an edge of a first side of the airbag cushion to roll/enclose the occupant at a predetermined time of "x" msec prior to a crash impact using a tether mechanism; and
enclosing the occupant between the first side and the second side of the airbag cushion for occupant protection at an onset of the crash impact.

18. The method of claim 17, further including dissipating fore/aft impact energy acting on the occupant using energy absorbing elements positioned between the airbag cushion and a vehicle interior.

19. The method of claim 17, further including inflating the airbag cushion to firmly grip the occupant between the first side and the second side of the airbag cushion.

* * * * *